United States Patent Office 2,858,813
Patented Nov. 4, 1958

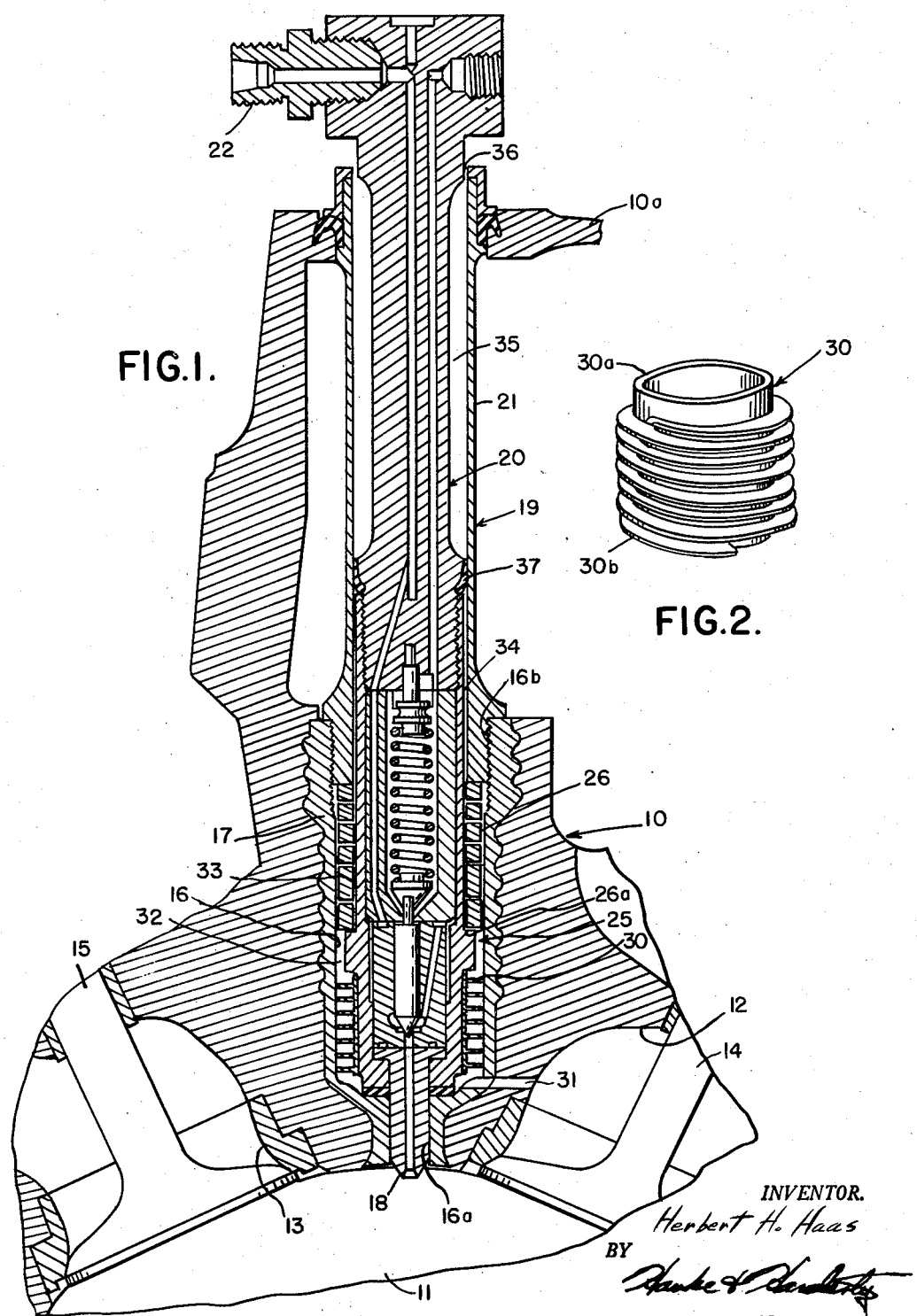

2,858,813
FUEL INJECTION NOZZLE COOLING

Herbert H. Haas, Royal Oak, Mich., assignor, by mesne assignments, to Continental Motors Corporation, Muskegon, Mich., a corporation of Virginia Application May 18, 1956, Serial No. 585,639

11 Claims. (Cl. 123—32)

This invention relates to internal combustion engines of the fuel injection type and more particularly to a means for cooling the injection nozzle.

In liquid cooled engines, cooling of the injection nozzle does not present too great a problem, since the cylinder head in which the injection nozzle is mounted may be provided with a cooling jacket sufficiently close to the nozzle to effect proper cooling. Likewise in air cooled engines where the injection nozzle is inserted into the side of the cylinder head, it is not much more of a problem to provide for effective circulation of cooling air around the nozzle. However, in the air cooled engine for which this invention is particularly adaptable, the injection nozzle is constructed to be inserted and removed directly through the rocker box covers on the top of the engine so that the nozzle tip will protrude into the combustion chamber between the intake and exhaust valve openings. The cylinder head at this location is fairly thick, so that heat build-up, due to combustion is relatively high and the injection nozzle is subject to damage thereby, since it is impractical and difficult to machine fins in the cylinder head adequately close to the nozzle and the nozzle as a whole is enclosed.

An object of this invention is to overcome these difficulties which are experienced in such engines by providing a fuel injection nozzle having an integral cooling means as part of its structure.

Another object of the present invention is to facilitate cooling of an enclosed fuel injection nozzle by providing a nozzle construction having cooling fins enclosed in the cylinder head and means for circulating cooling air through the fins.

A further object of the invention is to provide an enclosed fuel injection nozzle with integral cooling means by constructing a spirally finned member adapted to be assembled with a cylinder head and providing passages in the cylinder head and the nozzle for the circulation of cooling air to the aforesaid finned member.

For a more complete understanding of the present invention, reference may be had to the accompanying drawing illustrating a preferred embodiment of the invention, in which like reference characters refer to like parts throughout the several views and in which Fig. 1 is a fragmentary sectional view through an air cooled engine structure having an injection nozzle for which this invention is particularly adapted, and Fig. 2 is a perspective view of a part of the nozzle of Fig. 1.

In the drawing, an engine cylinder head 10 is illustrated as having a combustion chamber 11, an air intake passage 12, an exhaust passage 13, intake and exhaust valves 14 and 15 respectively, and an injection nozzle mounting bore 16. The bore 16 is preferably carried by a steel insert 17 as shown, and has a reduced diameter portion 16a into which is closely fitted a tip 18 of an injection nozzle assembly 19.

The fuel injection nozzle assembly 19 comprises a fuel injector mechanism 20 of which the tip 18 is a part, a sleeve-like hold down nut 21 preferably screwed into a threaded upper portion 16b of the bore 16 of said steel insert, and a fuel inlet fitting 22. The hold down nut 21 is supported at its upper end by a rocker box housing structure 10a.

From the lower end of the nut 21 to the reduced diameter bore portion 16a, the fuel injector mechanism 20 is substantially spaced from the wall of the bore 16 to provide an annular chamber 25. A flat spring-type spacer 26 preferably occupies the upper portion of the chamber 25, bearing on a shoulder 26a of the injector mechanism 20. The lower section of the chamber 25, below the shoulder 26, is occupied by a spirally finned member 30, which is shown in the perspective view of Fig. 2.

The member 30 is preferably machined from a single cylinder so as to comprise an inner sleeve 30a adapted to fit closely about the injector mechanism 20, and a continuous annular spiral fin 30b of such a diameter as to closely fit within the bore 16 of the steel insert 17, thereby forming a continuous spiral passage within the chamber 25. Said member 30 may be secured to the nozzle by a press fit or as suitably bonded thereto.

An air inlet passage 31 is provided in the cylinder head 10, preferably connecting the lower end of the chamber 25, between the member 30 and the tip 18, with some source of pressurized cooling air, such as the air intake passage 12 of a supercharged engine with a higher manifold pressure than atmosphere, or as the pressure side of an air cooling system. As illustrated in this preferred embodiment of the invention, manifold air is utilized for cooling, which has the advantage of providing greater air flow as the engine speed increases.

Due to the fin member 30, the cooling air is forced to follow a spiral path upward and annularly around the nozzle portion subjected to the greatest heat of combustion.

It will be seen that an annular clearance is provided between the shoulder 25 and the bore 16 at 32, between the spacer 26 and the injector mechanism 20 at 33, and between the injector mechanism 20 and the sleeve-like nut 21 at 34, 35 and 36. A one-way annular seal 37 is preferably provided as shown around the injector mechanism 20, for the purpose of preventing air or, in the case of a submersible engine, water and other foreign matter from passing downward. Thus, a continuous annular bleed for the cooling air is provided from the fin member 30 out the top of the injection nozzle, so that the injector mechanism 20 is insulated from undesirable heat sources substantially for its entire length.

Although only one preferred embodiment of the invention has been described herein, it will be apparent to those skilled in the art to which the invention pertains, that various changes and modifications may be made therein without departing from the spirit of the invention or the scope of the appended claims.

I claim:

1. In a fuel injection type internal combustion engine having a cylinder head provided with a combustion chamber, said cylinder head having a bore open to said combustion chamber and supporting a fuel injection nozzle assembly, said bore providing an annular chamber around said nozzle assembly, said nozzle assembly having cooling means comprising a spirally finned member disposed in said chamber and contacting the walls thereof to provide a continuous spiral air passage, cooling air inlet means open to one end of said spiral air passage and vent means open to the other end of said passage.

2. In a fuel injection type internal combustion engine having a cylinder head provided with a combustion chamber, said cylinder head having a bore open to said combustion chamber and supporting a fuel injection nozzle assembly, said bore providing an annular chamber around said nozzle assembly, said nozzle assembly having cooling means comprising a spirally finned member disposed in said chamber and contacting the walls thereof to provide a continuous spiral air passage, cooling air inlet means open to one end of said spiral air passage and vent means open to the other end of said spiral air passage, said spirally finned member comprising a cylinder structure secured around a portion of said nozzle assembly, and a continuous spiral fin secured to the outer surface of said cylinder structure and in contact with the inner surface of said bore.

3. In a fuel injection type internal combustion engine having a cylinder head provided with a combustion chamber, said cylinder head having a bore extending therethrough into said combustion chamber, and a fuel injection nozzle supported in said bore and spaced therefrom for a part of its length to provide an annular chamber, cooling means for said nozzle and comprising a heat exchange structure disposed in said annular chamber, cooling fluid inlet means open to one end of said heat exchange structure and means venting the other end of said heat exchange structure, said heat exchange structure constructed and arranged to effect circulation of cooling fluid in said chamber from said inlet means to said venting means in a substantially axial direction relative to said nozzle.

4. In a fuel injection type internal combustion engine having a cylinder head provided with a combustion chamber, said cylinder head having a bore extending therethrough into said combustion chamber, said bore having a substantially short reduced diameter portion immediately adjacent said combustion chamber, and a fuel injection nozzle supported in said bore and closely fitting same at said reduced diameter portion but spaced from said bore for a part of the nozzle length, cooling means for said nozzle and comprising a spiral fin structure disposed in the space between said nozzle and said bore and constructed to form a spiral cooling air passage annularly around said nozzle near said reduced diameter bore portion, cooling fluid inlet means open to the end of said spiral fin structure nearest said combustion chamber, and vent means open to the end of said spiral fin structure furthest from said combustion chamber.

5. In a fuel injection type internal combustion engine having a cylinder head provided with a combustion chamber, said cylinder head having a bore extending therethrough into said combustion chamber, said bore having a substantially short reduced diameter portion immediately adjacent said combustion chamber, and a fuel injection nozzle supported in said bore and closely fitting same at said reduced diameter portion and spaced from said bore for a part of the nozzle length, cooling means for said nozzle and comprising a spiral fin structure disposed in the space between said nozzle and said bore and constructed to form a spiral cooling fluid passage annularly around said nozzle near said reduced diameter bore portion, cooling fluid inlet means open to the end of said spiral fin structure nearest said combustion chamber, and vent means open to the end of said spiral fin structure furthest from said combustion chamber, said cooling fluid inlet means comprising a fluid passage in said cylinder head and open to a source of cooling fluid under pressure, and said vent means comprising a vent passage in said injector nozzle and open to atmosphere.

6. In a fuel injection type internal combustion engine having a cylinder head provided with a combustion chamber and a bore opening into said combustion chamber, a fuel injection nozzle structure supported in said bore and spaced therefrom for a part of its length to provide an annular passage surrounding said nozzle structure through which a cooling medium may be circulated in heat exchange relation with respect to the nozzle structure, said engine having air induction means, means connecting one end of said annular passage with said air induction means, and means venting the other end of said passage to the atmosphere externally of said cylinder head, said nozzle being constructed and arranged to effect circulation of cooling air from said air induction means through said passage to said venting means in a substantially axial direction relative to said nozzle.

7. In a fuel injection type internal combustion engine having a cylinder head provided with a combustion chamber and a bore opening into said combustion chamber, a fuel injection nozzle structure supported in said bore and spaced therefrom for a part of its length to provide a passage surrounding said nozzle structure through which a cooling medium may be circulated in heat exchange relation with respect to the nozzle structure, one end of said passage being vented to the atmosphere externally of said cylinder head, and means connecting the other end of said passage with a source of cooling air supply, said nozzle being constructed and arranged to effect circulation of cooling air from said air induction means through said passage to said venting means in a substantially axial direction relative to said nozzle.

8. In a fuel injection type internal combustion engine having a cylinder head provided with a combustion chamber and a bore opening into said combustion chamber, a fuel injection nozzle structure supported in said bore and spaced therefrom for a part of its length, a finned structure disposed in the space between said bore and said nozzle structure and contacting said bore and said nozzle structure to provide a tortuous passage through which a cooling medium may be circulated in heat exchange relation with respect to the nozzle structure, and means connecting said passage with a source of cooling air supply, said passage being vented to the atmosphere externally of said cylinder head.

9. In a fuel injection type internal combustion engine having a cylinder head provided with a combustion chamber, said cylinder head having a bore open to said combustion chamber and supporting a fuel injection nozzle assembly, said bore providing an annular chamber around said nozzle assembly, said nozzle assembly having cooling means comprising a finned structure disposed in said chamber and contacting the side wall thereof to provide a tortuous air passage, cooling air inlet means open to one end of said passage and vent means open to the other end of said passage.

10. In a fuel injection type internal combustion engine having a cylinder head provided with a combustion chamber, said cylinder head having a bore open to said combustion chamber and supporting a fuel injection nozzle assembly, said bore providing an annular chamber around said nozzle assembly, said nozzle assembly having cooling means comprising a finned structure disposed in said chamber to provide a tortuous air passage, cooling air inlet means open to one end of said passage and vent means open to the other end of said passage, and one way sealing means disposed in said vent means and operable to open only when air is being vented.

11. In a fuel injection type internal combustion engine having a cylinder head provided with a combustion chamber, said cylinder head having a bore open to said combustion chamber and supporting a fuel injection nozzle assembly, said nozzle assembly having cooling means comprising a finned structure disposed in said chamber to provide a tortuous air passage, cooling air inlet means open to one end of said passage and vent means open to the other end of said passage, said vent means comprising an annular passage in said injector nozzle assembly, and an annular one way sealing member disposed in said annular passage and operable to close same when air is not being exhausted from said air passage.

References Cited in the file of this patent

UNITED STATES PATENTS

| 2,322,606 | Ward | June 22, 1943 |
| 2,699,358 | Sonderegger | Jan. 11, 1955 |